April 8, 1969 T. T. HIGHLEY, JR 3,438,059

NON-CLOGGING PENPOINT FOR RECORDING SYSTEMS

Filed Oct. 18, 1967

United States Patent Office 3,438,059

Patented Apr. 8, 1969

3,438,059

NON-CLOGGING PENPOINT FOR RECORDING SYSTEMS

Thomas T. Highley, Jr., Glenside, Pa., assignor to Leeds & Northrup Company, Philadelphia, Pa., a corporation of Pennsylvania Filed Oct. 18, 1967, Ser. No. 676,144
Int. Cl. G01d *15/16, 15/18*
U.S. Cl. 346—140 2 Claims

ABSTRACT OF THE DISCLOSURE

A non-clogging penpoint for an ink recording system is provided by reason of the end of a capillary tube having a large part of its area removed from the end through which ink is supplied. The single or double ended taper of the capillary tube provides a discharge path through its side for foreign material including paper fiber loosened during movement of the penpoint in one direction across the paper as soon as the direction of movement is reversed. Width control of the line is afforded by the selected orientation of the wedge-shaped end relative to the recording paper.

*Background of the invention*

This invention relates generally to capillary penpoints and more specifically to non-clogging penpoints for use in chart recorders.

Chart recorders have been in use for many years. Generally, a recorder of this class provides for relative movement between a pen and chart paper in response to an external condition being measured. As an example, it may be desired to make a record of temperature over a period of time where an electrical signal proportional to temperature is applied to the recorder.

Three types of recorders enjoy the greatest popularity. One type utilizes a roll or strip of chart paper which is moved past an ink pen fluctuating in response to the external condition signal in a direction transverse to that of the paper movement. A second type of recorder utilizes a round chart which is rotated at a constant speed past a pen which fluctuates according to the changes sensed in the external condition being measured. A third type provides for moving the pen along either of the two coordinate axes according to two independent external signals and finds its greatest utility in laboratory research work.

In these types of recorders, a capillary tube ink pen is generally utilized to mark the chart paper with the desired information. The pen is a vital part of any recorder since its malfunction causes a loss of record.

Such pens have frequently been found to clog with foreign material after a period of operation. This will cause a loss of information to the user of the recorder. Since many recorders are operated in areas not constantly supervised, a large amount of valuable information may be lost before the malfunction is discovered and the pen cleaned. Even when the clogging may be discovered immediately, the necessity for cleaning the pen is a time-consuming, bothersome and messy job. Therefore, it is a primary object of this invention to provide a non-clogging capillary tube penpoint.

It is also desired at times to provide a penpoint which may be adjusted for line width control or to provide for a different line width in one direction of pen movement than in other directions. Therefore, it is a further object of this invention to provide a penpoint that may be used for various line widths resulting in improved resolution of the record.

*Summary of the invention*

These and other objects are accomplished by a novel penpoint that provides a path for discharge of any loosened paper fibers when the pen changes direction relative to paper. Furthermore, a trailing scrapping edge found on conventional penpoints is eliminated to prevent the loosening of paper fibers. These two improvements prevent pen clogging due to paper fibers and other foreign material working far into the capillary tube and blocking the normal flow of ink.

By cutting away an edge of a conventional capillary tube penpoint, line width control is made possible. The resulting penpoint may be shaped to draw a line of smaller width in one direction than its normal line width which the pen will still draw in another direction. The present invention does not require an additional tip as required in some prior art arrangements.

While the invention is distinctly pointed out in the appended claims, the preferred embodiments of the invention together with further objects and advantages thereof may best be understood with reference to the following description and accompanying drawings.

*Description of the preferred embodiments*

Figure 1:
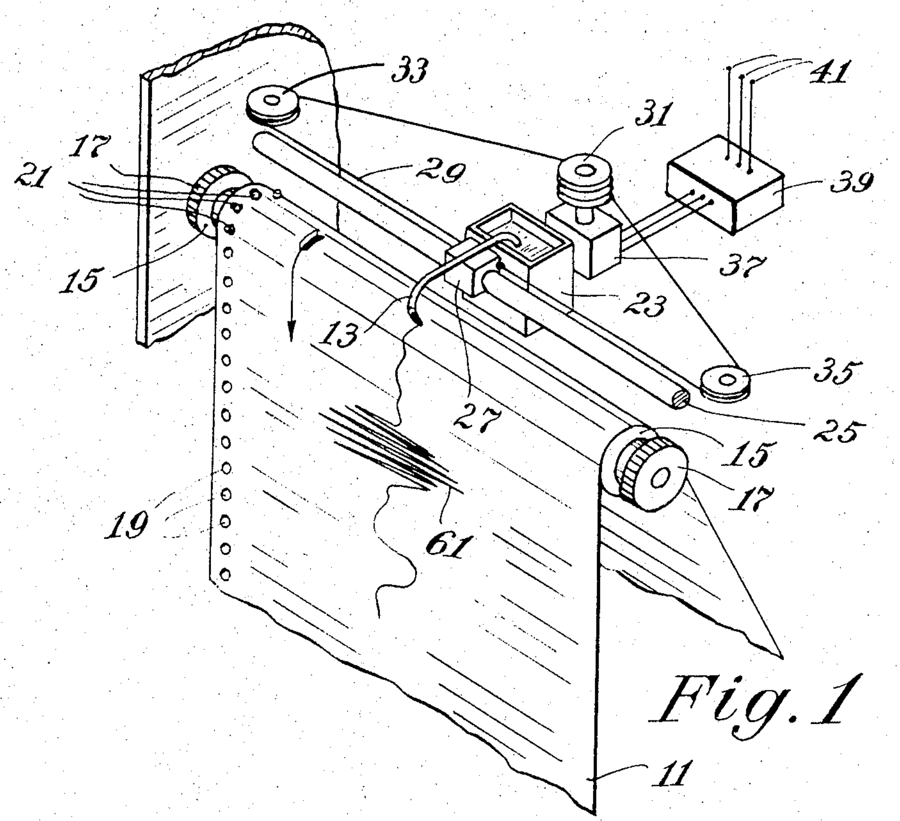
FIG. 1 shows the essential elements of a chart recorder which may utilize the improved penpoint of this invention in a preferred embodiment.

To specifically describe the invention, the improved penpoint is shown as part of a strip chart recorder but it is understood that the penpoint will also operate to advantage in a variety of mechanisms. Referring to FIG. 1, a strip chart 11 upon which the information is to be recorded is driven past a capillary ink pen 13 by a typical roller 15 which is driven through its gears 17 from some suitable motor source (not shown). The chart 11 has holes 19 along one edge for positive engagement with the pins 21 which are attached to the roller 15. The pen 13 is moved in a direction transverse to that of the advance of the paper 11 by sliding it and its ink supply reservoir 23 along a rod 25 by means of support block 27. A continuous cable 29 is driven by a drive pulley 31, guided by the pulleys 33 and 35 and attached to the block 27 for moving same relative to the rod 25. A motor and position sensing mechanism 37 provides motor source to a drive pulley 31 and operates in response to a measuring circuit 39. An E.M.F. proportional to the condition being measured is connected to the terminals 41 of the measuring circuit 39. The application of a signal at the terminals 41 causes the pen 13 to travel along rod 25 according to the magnitude of the signal.

Figure 2:
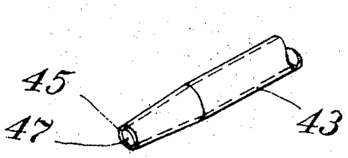
FIG. 2 shows a typical prior art capillary tube penpoint.

When ink is discharged from a pen onto ordinary chart paper and portions of the previous mark are retraced, fibers in the paper are caused to rise under the influence of the wetness. Referring to FIG. 2, a conventional capillary tube penpoint 43 is shown in enlargement. End surface 45 contacts the chart paper and moves relative thereto with ink being discharged from capillary bore 47. The capillary bore 47 is reduced in diameter at the penpoint by tapering the tube 43, resulting in a line drawn which is reduced in width. As the pen 43 moves relative to a paper, ink is discharged from the forward portion of capillary bore 47 causing paper fibers to rise and to then be sheared by the trailing edge of capillary bore 47. The loosened paper fibers are then entrapped within capillary bore 47 and cannot escape regardless of subsequent movements of the pen 43. As more and more of these paper fibers are sheared, they push up into capillary bore 47, restricting ink flow and making the pen inoperable. When this happens, signal information fed to the instrument is not recorded until an operator manually cleans capillary bore 47.

Figure 3:
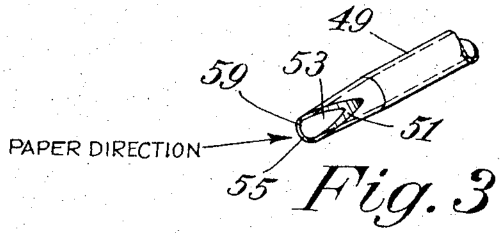
FIG. 3 is an enlarged view of an embodiment of the present invention.

An embodiment of the preferred penpoint of this invention is shown in FIG. 3, wherein capillary tube 49 has a portion of the tube wall removed from its end to form surface 51 and provide an opening in the side of the tube from capillary bore 53. Enough of the wall is removed to leave an end surface 55 for contact with the chart paper that is a circular segment in cross-section and is about one-half the original circumference of the end of the tube. With this configuration, if any foreign material such as sheared paper fibers come within capillary bore 53, they will be discharged through the side wall opening of this bore upon movement of the pen 49 in a direction other than that in which the foreign material was collected. It has been found that removal of approximately one-half the internal circumferential edge of the capillary bore 47 of the tube 43 to leave the internal edge 59 provides an adequate discharge path without sacrificing proper capillary action of the penpoint. It is to be understood that the removed portion of the side wall of the capillary tube may have a different configuration than the wedge-like shape illustrated and still have a non-clogging characteristic, the important requirement being that a discharge path be provided in the side wall of the capillary tube penpoint.

Figure 4:
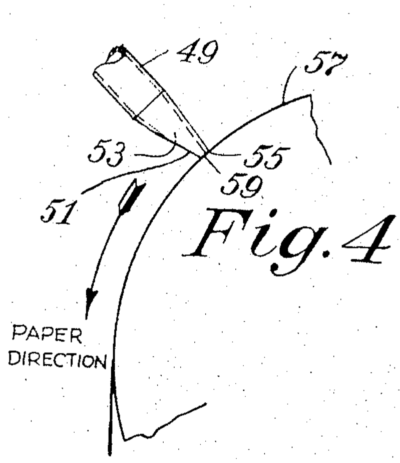
FIG. 4 shows one possible orientation of the penpoint of FIG. 3 relative to a chart paper.
Figure 5A:
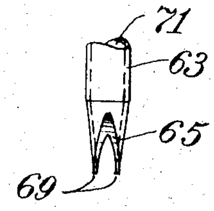
FIG. 5*a* shows another embodiment of the present invention.
Figure 5B:
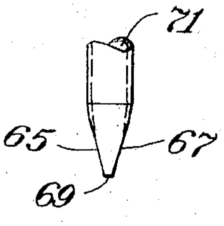
FIG. 5*b* is a side view of FIG. 5*a*.

The improved penpoint of FIG. 3 is shown in FIG. 4 in its preferred embodiment relative to movement of the paper with which it is in contact to reduce the shearing action of the penpoint as much as possible. Paper 57 is shown to move against penpoint 49 in a manner to avoid the shearing action of the only internal edge 59 of capillary bore 53 which contacts the paper 57. This preferred paper direction is also shown by an arrow in FIG. 3, where it is more clearly illustrated that the cutting edge of capillary bore 53, which is responsible for shearing wettened paper fibers characteristic of the prior art penpoint of FIG. 2, has been cut away. Therefore, the source of accumulation of foreign material responsible for pen clogging is significantly reduced. When the pen 49 of FIG. 3 moves in a direction transverse to the direction of paper movement, as it will in the embodiment of FIG. 1 in response to an external signal, there may be some shearing action by the edge 59 of capillary bore 53, but any fibers so sheared will be discharged through the side opening of pen 49, being carried by a fresh flow of ink through the opening of capillary bore 53 whenever penpoint 49 is reversed in direction.

It should be understood that the orientation of the improved penpoint relative to paper as hereinabove described is a preferred embodiment of the invention when utilized in a chart recorder. Any orientation of the improved penpoint relative to its movement on a chart paper will still provide a self-cleansing action through the side opening of capillary bore 53 whenever the pen point 49 changes direction with respect to the paper in a significant way. In some applications it may be desired to control the line width drawn by pen 49 which can be done simply by rotating the pen around its own axis. Referring to the orientation of FIG. 3, the line drawn in the direction of paper movement will be the widest, while the line drawn in a direction transverse to that shown for paper movement will be the narrowest that the penpoint can produce.

In a period where high signal activity is being recorded, the penpoint 13 of FIG. 1 will oscillate rapidly.

When the speed of paper 11 is slow, as is frequently the case in order to get a large amount of information on a small amount of chart paper, such a period of high activity will cause a great deal of ink to be discharged onto the paper 11, as shown by the heavy line density 61. When the improved penpoint of this invention is utilized and oriented in the preferred direction as hereinabove described with reference to FIG. 4, the line drawn in a direction transverse to that of the paper motion in response to a signal will be much narrower than is possible with prior art pens. As a result, less ink will be discharged onto the paper in a period of high activity, which has the advantage of reducing the number of fibers which will be raised due to the ink wetness and will also result in a neater chart.

FIGS. *5a* and *5b* show another embodiment of the present invention which has the same self-cleaning characteristics as the above-described embodiment, presents still less cutting edge to shear loosened paper fibers, and further presents a narrower line when moved in one direction relative to a paper while still allowing the drawing of a full width line in a direction transverse thereto. The capillary tube 63 is tapered on opposite sides to form surfaces 65 and 67, resulting in a small area 69 of the penpoint which contacts paper. The narrower width of the surface 69 will further improve the resolution where signal lines are very close together as shown in the area 61 of FIG. 1.

By so shaping the capillary tube 63, most of the internal edge of the capillary bore 71 is removed, thus removing much of the edge responsible for shearing raised paper fibers. To minimize the shearing action of this penpoint, as much of the paper-contacting internal edge of the capillary bore 71 should be removed as is possible without sacrifice of proper capillary action by the bore.

Although the preferred embodiments of the present invention have been described as having a capillary bore of circular cross-section, a bore of another shape may be utilized so long as proper capillary action is maintained.

What is claimed is:

1. In a chart recorder having a mechanism for advancing paper past an ink pen and further having a mechanism for moving said pen in a direction approximately transverse to the direction of said paper advance in response to a condition being measured, said pen comprising an elongated tubular member having a capillary bore of circular cross-section at the discharge end thereof, said discharge end having only one surface defining a circular segment in cross-section contacting said paper for discharge of ink thereon, and said circular segment being oriented to be the leading edge of said pen relative to the movement of said paper.

2. A graph recorder having a mechanism for advancing paper past an ink pen, said pen comprising, an elongated member having a capillary bore of circular cross-section and having one end thereof contacting said paper, the paper contacting end of said elongated member being tapered to present less than one-half the circumference of said capillary bore for contact with said paper, the circumferential section of said capillary bore being oriented to be the leading edge of said pen relative to the movement of said paper.

References Cited

UNITED STATES PATENTS

| | | | |
|---|---|---|---|
| 768,473 | 8/1904 | Manning | 346—140 |
| 1,463,004 | 7/1923 | Bowman | 346—140 |
| 2,032,991 | 3/1936 | Lange | 346—140 |
| 2,667,402 | 1/1954 | Traugott | 346—140 |
| 3,146,058 | 8/1964 | Henshaw | 346—140 |

RICHARD B. WILKINSON, *Primary Examiner.*

J. W. HARTARY, *Assistant Examiner.*